(12) United States Patent  
Vermette et al.

(10) Patent No.: US 8,839,033 B2  
(45) Date of Patent: Sep. 16, 2014

(54) DATA SUMMARIZATION RECOVERY

(75) Inventors: Shane Robert Vermette, San Carlos, CA (US); Amrit Mishra, Hydernagar (IN); Vijay Manguluru, Fremont, CA (US); Ajit Kumar Das, Hitec (IN)

(73) Assignee: Oracle International Corporation, Redwood Shores, CA (US)

( * ) Notice: Subject to any disclaimer, the term of this patent is extended or adjusted under 35 U.S.C. 154(b) by 379 days.

(21) Appl. No.: 13/408,045

(22) Filed: Feb. 29, 2012

(65) Prior Publication Data

US 2013/0227332 A1 Aug. 29, 2013

(51) Int. Cl.  
*G06F 11/00* (2006.01)

(52) U.S. Cl.  
USPC ............................................. 714/15; 714/21

(58) Field of Classification Search  
CPC . G06F 2201/87; G06F 9/466; G06F 11/0793; G06F 11/1474; G06F 11/2064; G06F 17/30362; G06F 17/30607  
See application file for complete search history.

(56) References Cited

U.S. PATENT DOCUMENTS

| | | | |
|---|---|---|---|
| 5,524,241 A * | 6/1996 | Ghoneimy et al. | ........... 707/676 |
| 6,119,222 A | 9/2000 | Shiell et al. | |
| 6,161,105 A | 12/2000 | Keighan et al. | |
| 6,513,065 B1 | 1/2003 | Hafez et al. | |
| 6,560,647 B1 | 5/2003 | Hafez et al. | |
| 6,748,384 B1 | 6/2004 | Rylander et al. | |
| 6,856,970 B1 | 2/2005 | Campbell et al. | |
| 6,978,265 B2 | 12/2005 | Schumacher | |
| 6,988,271 B2 | 1/2006 | Hunt | |
| 7,281,013 B2 | 10/2007 | Chaudhuri et al. | |
| 7,415,466 B2 * | 8/2008 | Ganesh et al. | ........................ 1/1 |
| 7,454,698 B2 | 11/2008 | Kohda et al. | |
| 7,509,684 B2 | 3/2009 | McDonald et al. | |
| 7,958,083 B2 | 6/2011 | Vermette et al. | |
| 7,962,458 B2 | 6/2011 | Holenstein et al. | |
| 7,979,385 B2 | 7/2011 | Vermette et al. | |
| 8,046,779 B2 | 10/2011 | Wusthoff et al. | |
| 2003/0163790 A1 | 8/2003 | Murata | |
| 2005/0066095 A1 | 3/2005 | Mullick et al. | |
| 2005/0262057 A1 | 11/2005 | Lesh et al. | |
| 2008/0077656 A1 | 3/2008 | Broda | |

(Continued)

OTHER PUBLICATIONS

Endress, W., "On-line Analytic Processing with Oracle Database 11g Release 2," An Oracle White Paper, Sep. 2009, 34 pages.

(Continued)

*Primary Examiner* — Scott Baderman  
*Assistant Examiner* — Jason Bryan  
(74) *Attorney, Agent, or Firm* — Kilpatrick Townsend & Stockton LLP

(57) ABSTRACT

Embodiments of the invention provide systems and methods for recovering a failed data summarization. According to one embodiment, recovering a failed instance can comprise processing existing summarization instances identified as instances for which a new data summarization instance needs to wait. Upon a completion or a timeout of each of the instances identified as instances for which the new data summarization instance needs to wait, an exclusive lock can be acquired on a table storing scope information for the plurality of data summarization instances. One or more existing data summarization instances that match the new data summarization instance or that have an overlapping scope with the new data summarization instance can be processed, remaining tasks to be performed by the new data summarization instance can be defined, the exclusive lock can be released, and the remaining tasks to be performed by the new data summarization instance can be performed.

20 Claims, 7 Drawing Sheets

(56) References Cited

U.S. PATENT DOCUMENTS

| | | |
|---|---|---|
| 2008/0300872 A1 | 12/2008 | Basu et al. |
| 2009/0248620 A1 | 10/2009 | Vermette |
| 2009/0248691 A1 | 10/2009 | Vermette |
| 2009/0276527 A1 | 11/2009 | McClain et al. |
| 2009/0303901 A1 | 12/2009 | Duffield et al. |
| 2009/0327290 A1 | 12/2009 | Vermette |
| 2009/0328043 A1 | 12/2009 | Vermette |
| 2010/0070448 A1 | 3/2010 | Omoigui |
| 2010/0332448 A1 | 12/2010 | Holenstein et al. |
| 2010/0332449 A1 | 12/2010 | Holenstein et al. |

OTHER PUBLICATIONS

Rosenberg, Deborah, "Methods for Summarizing Data", Analytic Methods in Maternal and Child Health, University of Illinois at Chicago, 1998, 37 pages.

Tanin, E., "Hierarchical Data Summarization", University of Melbourne, 2008, 6 pages.

U.S. Appl. No. 12/059,811, filed Mar. 31, 2008, Final Office Action mailed Feb. 14, 2013, 26 pages.

U.S. Appl. No. 12/059,811, filed Mar. 31, 2008, Advisory Action mailed Apr. 23, 2013, 3 pages.

U.S. Appl. No. 12/147,726, filed Jun. 27, 2008, Notice of Allowance mailed Nov. 26, 2012, 11 pages.

U.S. Appl. No. 13/398,301, filed Feb. 16, 2012, Non-Final Office Action mailed Feb. 4, 2013, 6 pages.

U.S. Appl. No. 12/059,811, filed Mar. 31, 2008, Office Action mailed Aug. 16, 2012, 18 pages.

U.S. Appl. No. 12/147,726, filed Jun. 27, 2008, Office Action mailed Aug. 14, 2012, 12 pages.

U.S. Appl. No. 12/059,811, filed Mar. 31, 2008, Advisory Action mailed Apr. 22, 2011, 3 pages.

U.S. Appl. No. 12/059,811, filed Mar. 31, 2008, Final Office Action mailed Feb. 9, 2011, 14 pages.

U.S. Appl. No. 12/059,811, filed Mar. 31, 2008, Office Action mailed Aug. 10, 2010, 14 pages.

U.S. Appl. No. 12/059,830, filed Mar. 31, 2008, Notice of Allowance mailed Mar. 17, 2011, 10 pages.

U.S. Appl. No. 12/059,830, filed Mar. 31, 2008, Advisory Action mailed Jan. 21, 2011, 2 pages.

U.S. Appl. No. 12/059,830, filed Mar. 31, 2008, Final Office Action mailed Nov. 24, 2010, 12 pages.

U.S. Appl. No. 12/059,830, filed Mar. 31, 2008, Office Action mailed Aug. 24, 2010, 20 pages.

U.S. Appl. No. 12/147,709, filed Jun. 27, 2008, Notice of Allowance mailed Mar. 22, 2011, 14 pages.

U.S. Appl. No. 12/147,709, filed Jun. 27, 2008, Office Action mailed Dec. 16, 2010, 9 pages.

U.S. Appl. No. 13/398,301, filed Feb. 16, 2012, Notice of Allowance mailed Jul. 31, 2013, 11 pages.

U.S. Appl. No. 12/059,811, filed Mar. 31, 2008, Terminal Disclaimer—Approved mailed Jul. 23, 2013, 1 pages.

U.S. Appl. No. 12/059,811, filed Mar. 31, 2008, Notice of Allowance mailed Jul. 29, 2013, 10 pages.

\* cited by examiner

DATA SUMMARIZATION RECOVERY

BACKGROUND OF THE INVENTION

Embodiments of the present invention relate generally to methods and systems for providing summarizations of data and transactions related to one or more applications and more particularly to providing summarizations of data and transactions including recovery of failed summarization instances.

A common business need is to summarize data that exists in a system. This can be accomplished using a summarization program. A summarization program can involve any number of functional data transformations that bring data from an existing state in a system to a state that is ready or closer to being ready to be viewed by an end user, (e.g., in a report). A report may be any entity that displays summarized data to an end user, for example in a performance reporting dashboard of a user interface. In bringing summary data into such a dashboard, any number of users can be running the summarization program at any given time. Besides the architecture for efficiently dealing with and processing all those requests, there are additional problems to be solved when things do not go as expected. Dealing with source system data corruption issues, environment issues up to and including plug-pulls, and even some code bugs, can lead to very complex scenarios from which the summarization program must seamlessly recover.

For example, the problem remains of how to sort out the existing state when any number of failed summarization instances can exist, and any number of users can concurrently be attempting to clean up those failed summarization instances, as well as any number of users concurrently running summarization normally (not attempting to recover from previous failure). The problem is further complicated when considerations such as security and system resource limitations are introduced (e.g. there may be practical or imposed limits on the total number of failed or concurrently running summarization instances that can exist at any one time). The parameters passed to an instance of summarization can determine some number of elements that make up the scope of the summarization instance. Depending on how users choose to pass parameters to summarization instances, and whether imposed data security allows access to some or all of the elements defined by the parameters, then summarization instances can have scope that overlaps with the scope of other summarization instances.

In previous solutions to these problems, if a failed or running instance of summarization exists on a given scope, then any new attempted instance that overlaps with the scope of the existing instance may not be allowed to run and may be forced to raise an error. However it can be a very frustrating user experience to try to predict when it is safe to run summarization. Also in previous solutions, when failures occur, summarization instances can be left to be cleaned up by some external method or user influence. However again, the user can become frustrated when special actions are needed to clean up failed summarization instances. If the scope of summarization that a user has submitted overlaps with the scope of a running summarization instance, then the newly submitted instance can wait forever or can timeout and fail. However, there are several related scenarios in which useful data can still be summarized for the user but previous solutions do not address these scenarios. Hence, there is a need for improved methods and systems for providing summarizations of data and transactions related to an application such as a project management application.

BRIEF SUMMARY OF THE INVENTION

Embodiments of the invention provide systems and methods for providing summarizations of data and transactions related to one or more applications in a transaction processing system that can include recovery of summarization instances so that a more complete summarization can be provided. According to one embodiment, a method for recovering a failed data summarization instance of a plurality of data summarization instances can comprise processing one or more existing data summarization instances of the plurality of data summarization instances identified as an instance for which a new data summarization instance needs to wait. Upon a completion or a timeout of each of the one or more existing data summarization instances identified as instances for which the new data summarization instance needs to wait, an exclusive lock can be acquired on a table storing scope information for the plurality of data summarization instances. One or more existing data summarization instances of the plurality of data summarization instances that match the new data summarization instance or that have an overlapping scope with the new data summarization instance can be processed, remaining tasks to be performed by the new data summarization instance can be defined, the exclusive lock can be released, and the remaining tasks to be performed by the new data summarization instance can be performed.

Processing existing data summarization instances identified as data summarization instances for which the new data summarization instance needs to wait can comprise setting a timeout limit for each data summarization instance identified as data summarization instances for which the new data summarization instance needs to wait. Periodically a status of each data summarization instance identified as data summarization instances for which the new data summarization instance needs to wait can be polled and any data summarization instance identified as data summarization instances for which the new data summarization instance needs to wait that has exceeded the timeout limit can be expired. Polling a status of each data summarization instance identified as data summarization instances for which the new data summarization instance needs to wait and expiring any data summarization instance identified as data summarization instances for which the new data summarization instance needs to wait that has exceeded the timeout limit can be repeated until all data summarization instance identified as data summarization instances for which the new data summarization instance needs to wait have completed or expired.

Processing existing data summarization instances that match the new data summarization instance can comprise determining whether an existing data summarization instance that matches the new data summarization instance is running. In response to determining that the matching existing data summarization instance is not running, the new data summarization instance can be rolled back, the exclusive lock can be released, and the new data summarization instance can pick up the matching existing data summarization instance. In response to determining that the matching existing data summarization instance is running, a further determination can be made as to whether the matching existing data summarization instance is a bulk data summarization instance. In response to determining the running matching existing data summarization instance is not a bulk data summarization instance, the new data summarization instance can be rolled back, the exclusive lock can be released, the running matching existing data summarization instance can be allowed to finish or timeout, the timeout causing an error message to be issued and further processing of the new data summarization instance to be ended, and the new data summarization instance can be restarted. In response to determining the running matching existing data summarization instance is a bulk data summarization instance, an error message can be issued and further processing of the new data summarization instance can be ended.

Processing existing data summarization instances that have an overlapping scope with the new data summarization instance can comprise determining whether the new data summarization instance that has an overlapping scope with existing data summarization instances is a bulk summarization instance. In response to determining the new data summarization instance that has an overlapping scope with existing data summarization instances is a bulk summarization instance, an error message can be issued and further processing of the new data summarization instance can be ended. In response to determining that the new data summarization instance that has an overlapping scope with existing summarization instances is not a bulk summarization instance, a list of existing data summarization instances to resubmit and a list of existing data summarization instances to wait for can be created. Any existing data summarization instances to resubmit or any existing data summarization instances to wait for that are newly added to the lists, any incremental or re-extract existing data summarization instances, and any online existing data summarization instances can be processed. Processing any existing data summarization instances to resubmit or any existing data summarization instances to wait for that are newly added to the lists can comprise deleting overlapping scope from the new data summarization instance. Processing any incremental or re-extract existing data summarization instances can comprise rolling back the new data summarization instance, releasing the exclusive lock, and resubmitting any non-bulk existing data summarization instances in the list. Processing any online existing data summarization instances can comprise determining whether the new data summarization instance is an online instance and in response to determining that the new data summarization instance is not an online instance, rolling back the new data summarization instance, releasing the exclusive lock, and restarting data summarization. Processing the new data summarization instance can further comprise in response to determining the new data summarization instance is an online instance, determining whether the new data summarization instance overlaps with non-online instances. In response to determining that the new data summarization instance does not overlap with non-online instances rolling back the new data summarization instance, releasing the exclusive lock, and resubmitting the new data summarization instance, and in response to determining that the new data summarization instance overlaps with non-online instances, issuing an error message and ending further processing of the new data summarization instance.

DETAILED DESCRIPTION OF THE INVENTION

Figure 1:
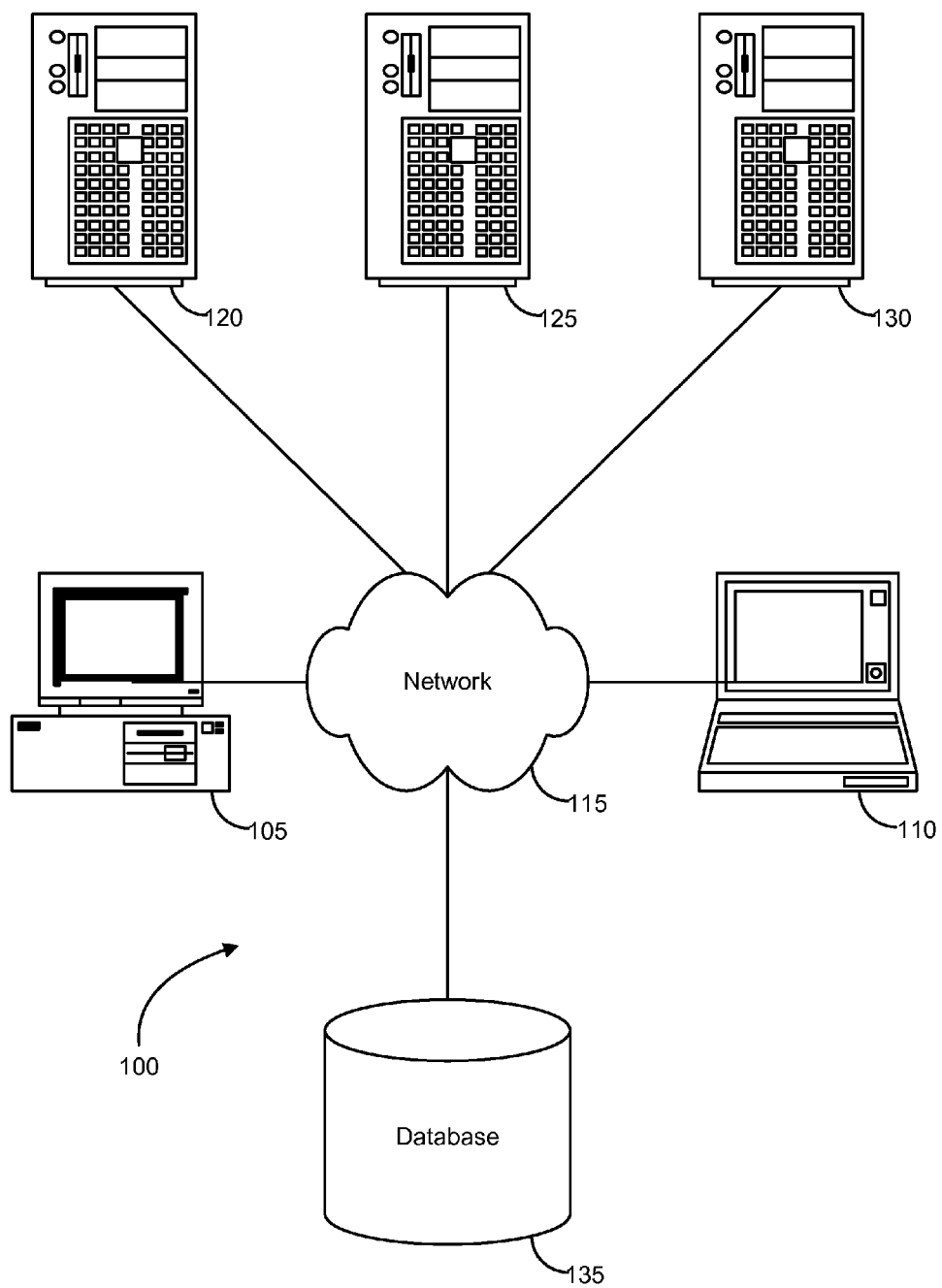
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing summarizations of data and transactions related to one or more applications in a transaction processing system that can include recovery of summarization instances so that a more complete summarization can be provided. More specifically, embodiments provide a summarization program adapted to take actions to get whatever data it can into the dashboard or report, with minimal input from users, while at the same time recording what did not get into the dashboard and why it did not. So for example, a newly submitted summarization instance can attempt to resubmit new and overlapping summarization instances, can wait for running and/or previously submitted overlapping instances of summarization, and can skip the scope of summarization instances that fail too many times, and notify the user of actions taken. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
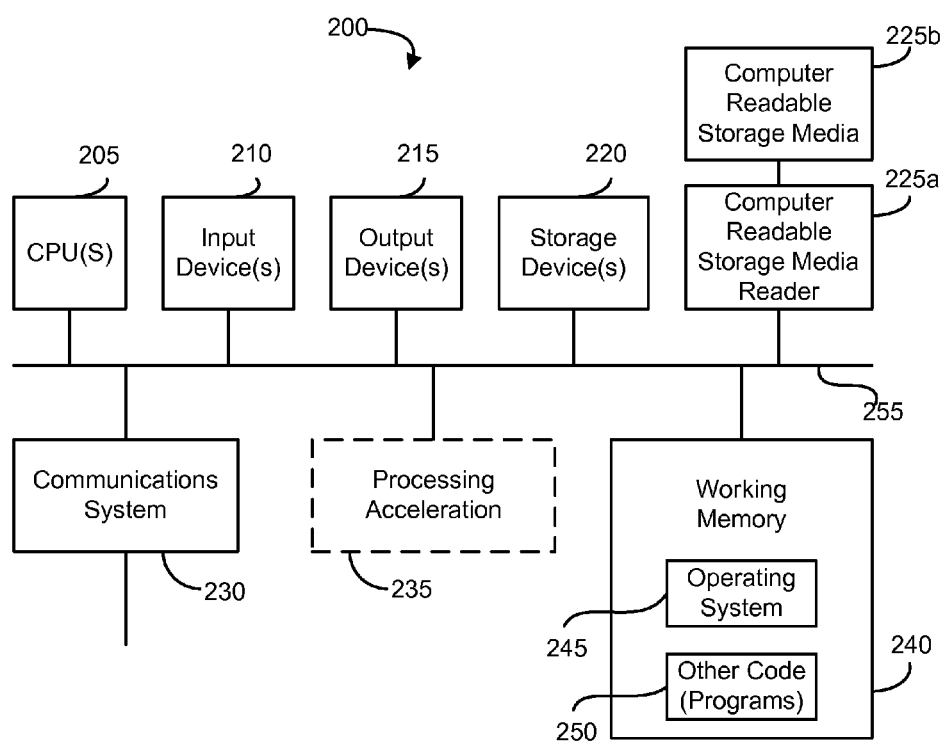
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
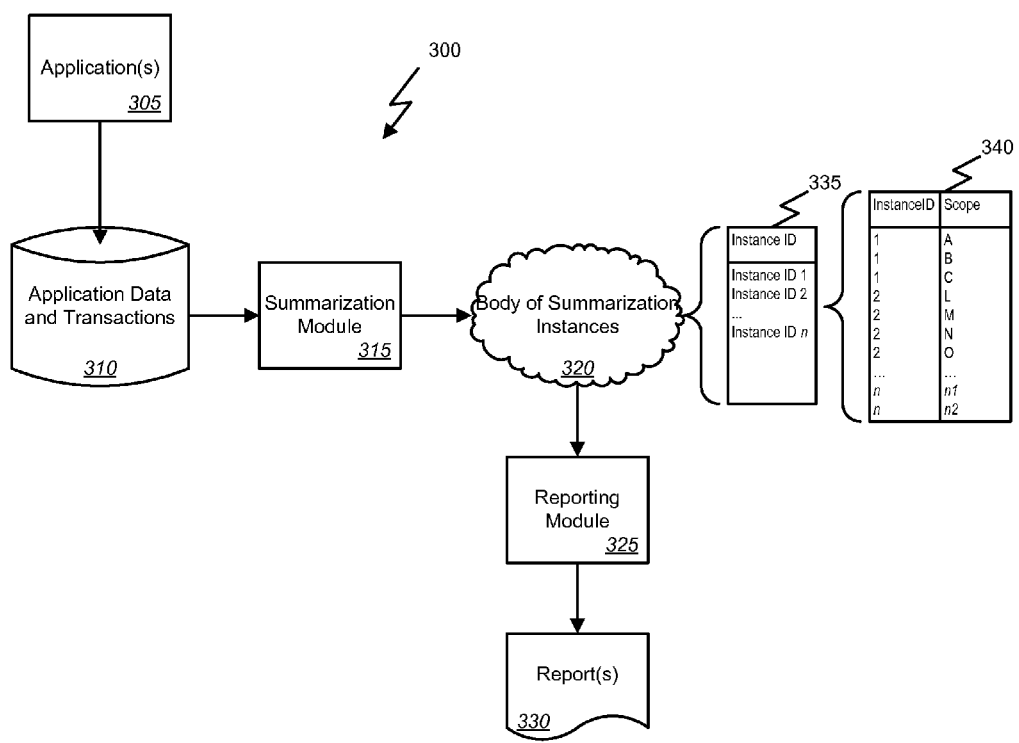
FIG. 3 is a block diagram illustrating, at a high-level, functional components of a system for providing data summarization recovery according to one embodiment of the present invention.

FIG. 3 is a block diagram illustrating, at a high-level, functional components of a system for providing data summarization recovery according to one embodiment of the present invention. In this example, the system 300 can include one or more applications 305 for processing data and/or transactions including but not limited to any of a variety of different enterprise applications. These applications 305 can store and maintain the data and transactions in one or more repositories 310 such as a relational database (RDBMS) and/or a multidimensional database (MDBMS). A summarization module 315 or program can access the repositories 312 and 314 and generate a body of summarization instances 320 that include data transformations that bring the data stored in the repositories 310 to a state to be viewed by an end user, (e.g., in a report 330 presented by a reporting module). The report 330 may be any form that displays summarized data to an end user, for example through a reporting dashboard of a user interface for the application 305.

This example illustrates additional details of the body of summarization instances 320 introduced above that maybe generated by the summarization module 315 and used by the reporting module 325 to generate one or more reports 330. As illustrated here, the body of summarization instances 320 can include any number of instances 335, each having a corresponding instance identifier. Other information for each instance and related thereto based on the instance identifier can include a defined summarization scope 340

Generally speaking, an instance of summarization can contain any number of database transactions to be executed in serial and parallel, each satisfying some portion of a set of functional data transformations. Consider a particular summarization instance which can have InstanceID "i." This instance of summarization can be one instance among all existing summarization instances 320. At any time, multiple users can attempt to instantiate summarization so, for example, to bring their data into the reporting dashboard. These attempts can add to the body of summarization instances 320.

For the instance of summarization i, in becoming an instance of summarization it has a particular scope 340 defined, which can be a list of elements unique among all instances of summarization and is used to identify the data in the source system on which to execute the functional data transformations. The instance of summarization i then proceeds to summarize data for its elements of "Scope", for example "A", "B" and "C" in 340. If instance of summarization i is completed, then the state for summarization instance i can be removed in which case it would no longer be an instance of summarization in the body of summarization instances 320.

According to embodiments described herein, the summarization module 315 and/or the reporting module 325 can be adapted to recover summarization instances by taking actions to get whatever data it can into the dashboard or report with minimal input from users, while at the same time recording what did not get into the dashboard and why it did not. So for example, a newly submitted summarization instance can attempt to resubmit existing overlapping summarization instances, can wait for running and/or previously submitted overlapping instances of summarization, and can skip the scope of summarization instances that fail too many times or that run too long, and can notify the user of actions taken. In describing the recovery of summarizations, various terms will be used herein for which the following descriptions are provided.

Existing instance (i.e., Bulk, Incremental, Reextract, Online, etc.): Can be considered to be a summarization instance that exists in the body of summarization instances 320 at the time a newly submitted summarization instance acquires an exclusive lock on the scope of the instances. It can either be currently running, or failed. Note that the last database transaction of a summarization instance can clean its state. Therefore, a completed summarization instance cannot be an existing or failed summarization instance since by design it will no longer have any database state. Also note, a newly submitted summarization instance does not become an existing summarization instance until it commits its state to the database 310 in its first database transaction.

New instance (i.e., Bulk, Incremental, Reextract, Online, etc.): Can be considered to be any newly submitted summarization instance 320 that has acquired the exclusive lock but has not yet committed its state and released the exclusive lock.

Params: Can be the parameters passed to a newly submitted summarization instance (e.g. Summarization Method (e.g. Bulk, Incremental, Reextract, Online), From Project, To Project, Business Unit, etc.).

Identical/Different Params: Whether or not two summarization instances have exactly the same parameters.

Scope: Can be considered to be the result of the translation of the parameters of a summarization instance into a list of elements that can be compared with the scope of another summarization instance to determine if the two summarization instances are attempting to work on some or all of the same data.

Overlapping/Non-Overlapping: Can be determined for two instances based on whether or not at least one element in the scope of one summarization instance is the same as at least one element in the scope of another summarization instance. If such an element exists, then the two summarization instances can be considered to be overlapping, else they can be considered to be non-overlapping.

Running/Failed: Can be determined for an instance based on whether or not an existing summarization instance has a thread currently executing its code. If the thread exists, then the existing summarization instance can be considered to be running, else it can be considered to be failed (recall that a completed summarization instance cannot be an existing summarization instance).

Run: In this situation, the newly submitted summarization instance can finalize its scope, commit to release the exclusive lock (hence becoming an existing summarization instance) and continue its work.

Pick up: In this situation, the newly submitted summarization instance can assume the scope of the failed summarization instance, commit to release the exclusive lock (hence becoming an existing summarization instance), and pick up where the failed instance had left off, continuing with the next incomplete database transaction of that failed summarization instance.

Fail: In this situation, the newly submitted summarization instance encountered one of the situations in which it is not desirable to continue running. The newly submitted summarization instance can report the reason for failure and can report the existing summarization instance(s) because of which it will not continue. The new instance can rollback, releasing the exclusive lock, and cease execution (hence never becoming an existing summarization instance). Note that since the first transaction of the newly submitted summarization instance is rolled back, the newly submitted summarization instance will not have stored any state in the database, but if determining the scope of summarization is a sufficiently expensive operation, the scope can be cached for that particular set of parameters for future use as needed.

Skip: In this situation, the newly submitted summarization instance can remove from its scope the elements that overlap with an existing summarization instance it has decided to skip. Any skipped scope can be reported to the user.

Resubmit: In this situation, the newly submitted summarization instance can spawn another newly submitted summarization instance with the same parameters to an existing summarization instance. Note that this can cause the spawned newly submitted summarization instance to "Pick up" an existing summarization instance.

Wait: In this situation, the newly submitted summarization instance can wait for an existing summarization instance to complete. If the existing summarization instance completes, the newly submitted summarization instance can continue. If the existing summarization instance fails or a timeout is reached then the scope of the existing summarization instance can be skipped so that the newly submitted summarization instance can continue on the remaining scope. Note that the newly submitted summarization instance can release the exclusive lock while it is waiting and then revalidate its scope after it re-obtains the exclusive lock after a suitable waiting period. When the scope cannot be skipped, for example as in a special ONLINE situation detailed herein, the newly submitted summarization instance may fail if the existing summarization instance fails or does not complete before a timeout.

According to one embodiment, particular rules defining how summarization should behave in various recovery scenarios are designed to improve user experience. Based on the definitions above, TABLE 1 illustrates different combinations of events that can be defined by such rules.

TABLE 1

|  |  |  | Existing BULK | | Existing INCREMENTAL | | Existing REEXTRACT | | Existing ONLINE | |
|---|---|---|---|---|---|---|---|---|---|---|
|  | Params | Scope | Running | Failed | Running | Failed | Running | Failed | Running | Failed |
| New BULK | Identical | Overlapping | Fail | Pick up | n/a | n/a | n/a | n/a | n/a | n/a |
|  | Different | Overlapping | Fail | Fail | Fail | Fail | Fail | Fail | Fail | Fail |
|  |  | Non-Overlapping | Run | Run | Run | Run | Run | Run | Run | Run |
| New INCREMENTAL | Identical | Overlapping | n/a | n/a | Wait/Run | Pick up | n/a | n/a | n/a | n/a |
|  | Different | Overlapping | Skip/Run | Skip/Run | Wait/Skip/Run | Resubmit/Wait/Skip/Run | Wait/Skip/Run | Resubmit/Wait/Skip/Run | Wait/Skip/Run | Resubmit/Wait/Skip/Run |
|  |  | Non-Overlapping | Run | Run | Run | Run | Run | Run | Run | Run |
| New REEXTRACT | Identical | Overlapping | n/a | n/a | n/a | n/a | Wait/Run | Pick up | n/a | n/a |
|  | Different | Overlapping | Skip/Run | Skip/Run | Wait/Skip/Run | Resubmit/Wait/Skip/Run | Wait/Skip/Run | Resubmit/Wait/Skip/Run | Wait/Skip/Run | Resubmit/Wait/Skip/Run |
|  |  | Non-Overlapping | Run | Run | Run | Run | Run | Run | Run | Run |
| New ONLINE | Identical | Overlapping | n/a | n/a | n/a | n/a | n/a | n/a | Wait/Run | Pick up |
|  | Different | Overlapping | Fail | Fail | Fail | Fail | Fail | Fail | Wait/Run | Resubmit/Wait/Run |

TABLE 1-continued

| Params | Scope | Existing BULK | | Existing INCREMENTAL | | Existing REEXTRACT | | Existing ONLINE | |
|---|---|---|---|---|---|---|---|---|---|
| | | Running | Failed | Running | Failed | Running | Failed | Running | Failed |
| | Non-Overlapping | Run | Run | Run | Run | Run | Run | Run | Run |

For example, based on column 4, row 3 in Table 1: for a newly submitted instance of bulk summarization, if it encounters an existing running instance of Bulk summarization with identical parameters (hence overlapping scope), then the newly submitted instance of bulk summarization fails with an appropriate message. Whenever a newly submitted summarization instance is affected by an existing summarization instance, then it can output whatever existing summarization instances affected it and how it handled those existing summarization instances. It should be understood that Table 1 illustrates one particular implementation and that the exact behaviors described in Table 1 can be adapted to a particular implementation's requirements. Additionally, it should be understood that the processes for recovering a summarization instance need not be implemented or defined in a set of rules. Rather, the processes for recovering a summarization instance can be implemented as a set of algorithms such as will be described below.

Regardless of the exact implementation, embodiments of the present invention can be accessible to users in various ways, such as with a project manager who may not have concern for existing summarization instances and just wants to see data in the dashboard. Implementing summarization according to embodiments of the present invention can help ensure that any data that can be shown will be shown and that the current state of relevant errors will be shown to the project manager as needed. Also, a system administrator can query the state of existing summarization instances and determine what course of action, including what types of summarization instances to re-submit, to easily clean up different subsets of issues.

A project manager will typically run summarization without regard for existing summarization instances. For this reason, the normal use-cases for the project manager (the incremental and online methods of summarization), can reduce the potential for designed failure. However, it will still be useful for the project manager to have a list of relevant existing summarization instances for analysis. The security permissions of a user, including the project manager, can also restrict the scope of summarization on which the project manager is allowed to run summarization. The concept of an element of scope is defined at the design time of a summarization program. Therefore, it should be considered whether a failed summarization instance on some element of scope may hinder a user from running summarization on a different set of parameters such that the user may not understand the conflict. The scope can be designed to minimize such conflicts.

A system administrator has more concern for the underlying mechanics of the recovery processes. The system administrator can take advantage of the recovery processes and can, for example, submit a request with a range of parameters to attempt to clean up many failed summarization instances or submit a request with a specific set of parameters to pinpoint the cleanup. There can be a way to specify a scope and run the recovery methods without picking up an existing summarization instance since the recovery methods occur before a newly submitted summarization instance becomes an existing summarization instance. Furthermore, tools can be created to help the system administrator. One tool might present a list of summarization instances that have failed as a result of the system administrator's actions such as while running BULK summarization. Another tool might suggest summarization parameters to efficiently cover the scope of existing failed instances and identify chains of overlapping instances and dependencies and suggest a recovery plan (recall that the state of each existing summarization instance is stored in the database). Another tool might allow particular summarization runs to be selected and "rolled back"; they could also be selected by defining scope in the same way scope is defined for a summarization instance. Depending on whether an implementation has a wrapper around the summarization program, it may also be advantageous to catch errors and return a warning state to the wrapper. Additionally or alternatively, a tool to purge all data and start from scratch can be built into the summarization program architecture and/or a tool can also be devised to purge data for a particular summarization scope. Another tool might allow the system administrator to view the scope of a failed summarization instance and see if it is possible to recover just a portion of the scope (if, for example, the error is not with all of the scope). Another tool might allow the system administrator to cancel a long queue of newly submitted summarization instances before they become existing summarization instances.

Another role, a developer, can determine scenarios in which the recovery methods can be used not only in the development process, but also during patching and bug fixes similar to the scenarios used by the system administrator.

Figure 4:
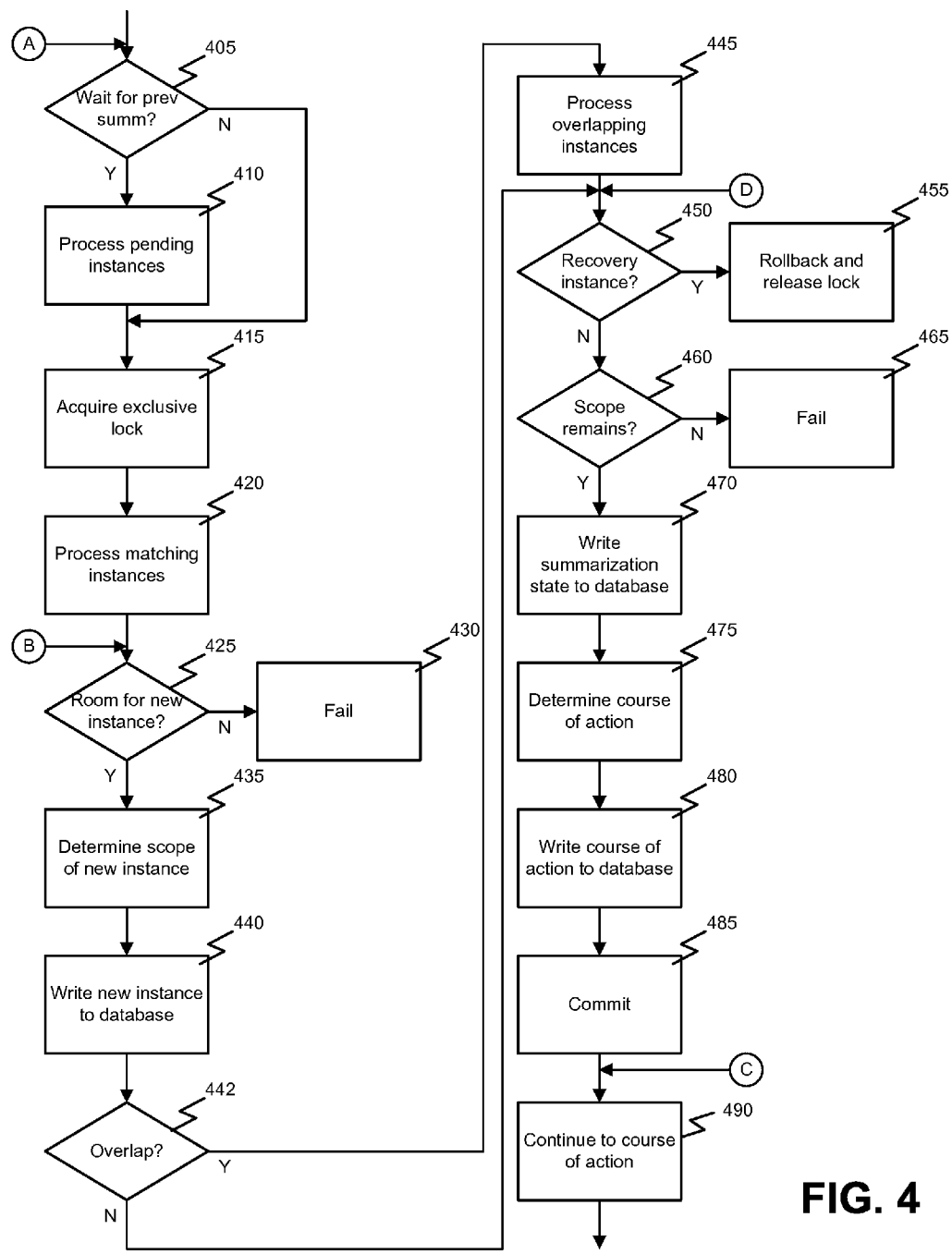
FIG. 4 is a flowchart illustrating a process for providing data summarization recovery according to one embodiment of the present invention.

FIG. 4 is a flowchart illustrating a process for providing data summarization recovery according to one embodiment of the present invention. In this example, recovering a failed data summarization instance of a plurality of data summarization instances can begin with determining 405 whether a newly submitted summarization should wait for any previous summarization instances. In response to determining 405 that there are summarization instances to wait for, one or more existing data summarization instances of the plurality of data summarization instances identified as an instance(s) for which the newly submitted data summarization instance needs to wait 410 may or may not complete before the newly submitted summarization instance decides it must timeout on waiting for the existing data summarization instance(s). An exemplary process for handling these summarization instances is described in greater detail below with reference to FIG. 5.

In response to determining 405 that there are summarization instances to wait for or upon a completion or a timeout of each of the one or more existing data summarization instances identified as instances for which the newly submitted data summarization instance needs to wait, an exclusive lock can be acquired 415 on a table storing scope information for the plurality of data summarization instances. One or more existing data summarization instances of the plurality of data summarization instances that exactly match the newly submitted data summarization instance can then be processed 420. An exemplary process for processing existing data summarization instances of the plurality of data summarization instances that exactly match the newly submitted data summarization instance will be described in greater detail below with reference to FIG. 6. In some cases, a determination 425 can be made as to whether there is sufficient room in memory for a new summarization instance. If a determination 425 is made that there is not sufficient room, the recovery process may stop 430 and an error message can be issued.

If a determination 425 is made that there is sufficient room for the new instance, a scope of the new summarization instance can be determined 435 and the new summarization instance can be written 440 to the database or other memory. One or more existing data summarization instances that have an overlapping scope with a new data summarization instance can then be processed 445. An exemplary process for processing existing data summarization instances that have an overlapping scope with the new data summarization instance will be described in greater detail below with reference to FIG. 7. A determination 450 can then be made as to whether the new summarization instance is a recovery-only instance. In response to determining 450 the new summarization instance is a recovery-only instance, the new summarization instance can be rolled back 455, the exclusive lock can be released, and the recovery-only process may stop.

In response to determining 450 that the new summarization instance is not a recovery-only instance, a further determination 460 can be made as to whether scope remains in the new summarization instance to be processed. In response to determining 460 no scope remains in the new summarization instance to be processed, the new summarization instance may stop 465 and an error message can be issued.

In response to determining 460 scope does remain in the new summarization instance to be processed, the parameters and scope for the newly submitted summarization instance can be recorded 470 into the in database. Remaining tasks to be performed by the new data summarization instance can be used to define 475 a course of action for the new summarization instance. These tasks or course of action can be saved 480 to the repository or other memory and then committed and the exclusive lock can be released 485. The remaining tasks defining the course of action for the new summarization instance can then be performed 490.

Figure 5:
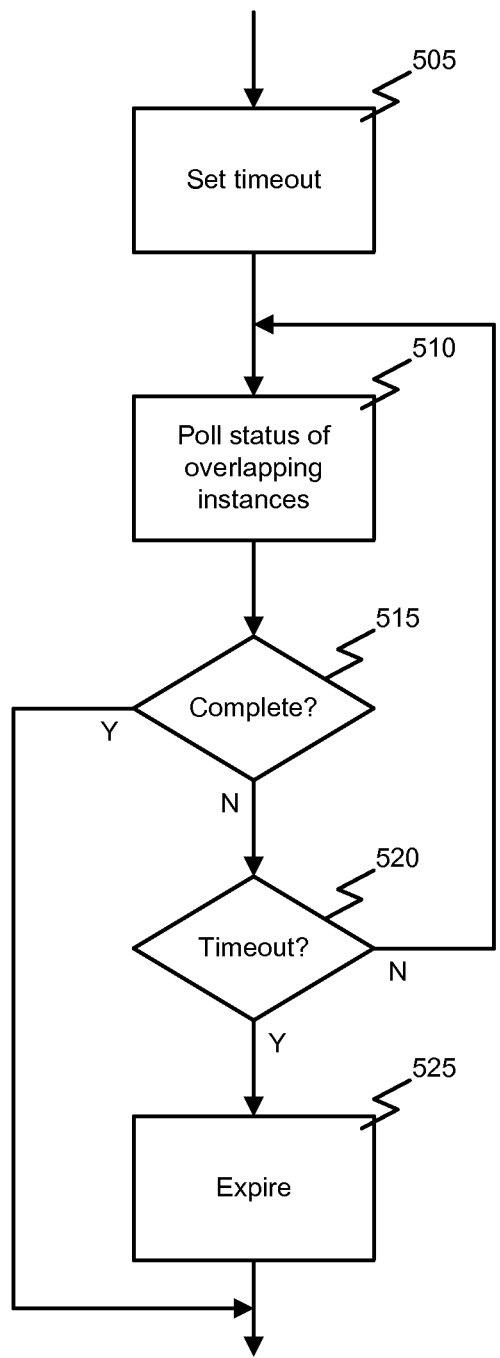
FIG. 5 is a flowchart illustrating additional details of an exemplary process for processing existing summarization instances according to one embodiment of the present invention.

FIG. 5 is a flowchart illustrating additional details of an exemplary process for processing existing summarization instances according to one embodiment of the present invention. In this example, processing existing data summarization instances identified as data summarization instances for which the new data summarization instance needs to wait can comprise setting 505 a timeout limit for each data summarization instance identified as a data summarization instance for which the new data summarization instance needs to wait. A status of each data summarization instance identified as a data summarization instance for which the new data summarization instance needs to wait can be periodically polled 510. Any data summarization instance identified as a data summarization instance for which the new data summarization instance needs to wait that has not yet completed 515 and the has exceeded 520 the timeout limit can be expired 525. Polling 510 a status of each data summarization instance identified as a data summarization instance for which the new data summarization instance needs to wait and expiring 525 any data summarization instance identified as a data summarization instance for which the new data summarization instance needs to wait that has not yet completed 515 and the has exceeded 520 the timeout limit can be repeated until all data summarization instances identified as data summarization instances for which the new data summarization instance needs to wait have completed or expired.

Figure 6:
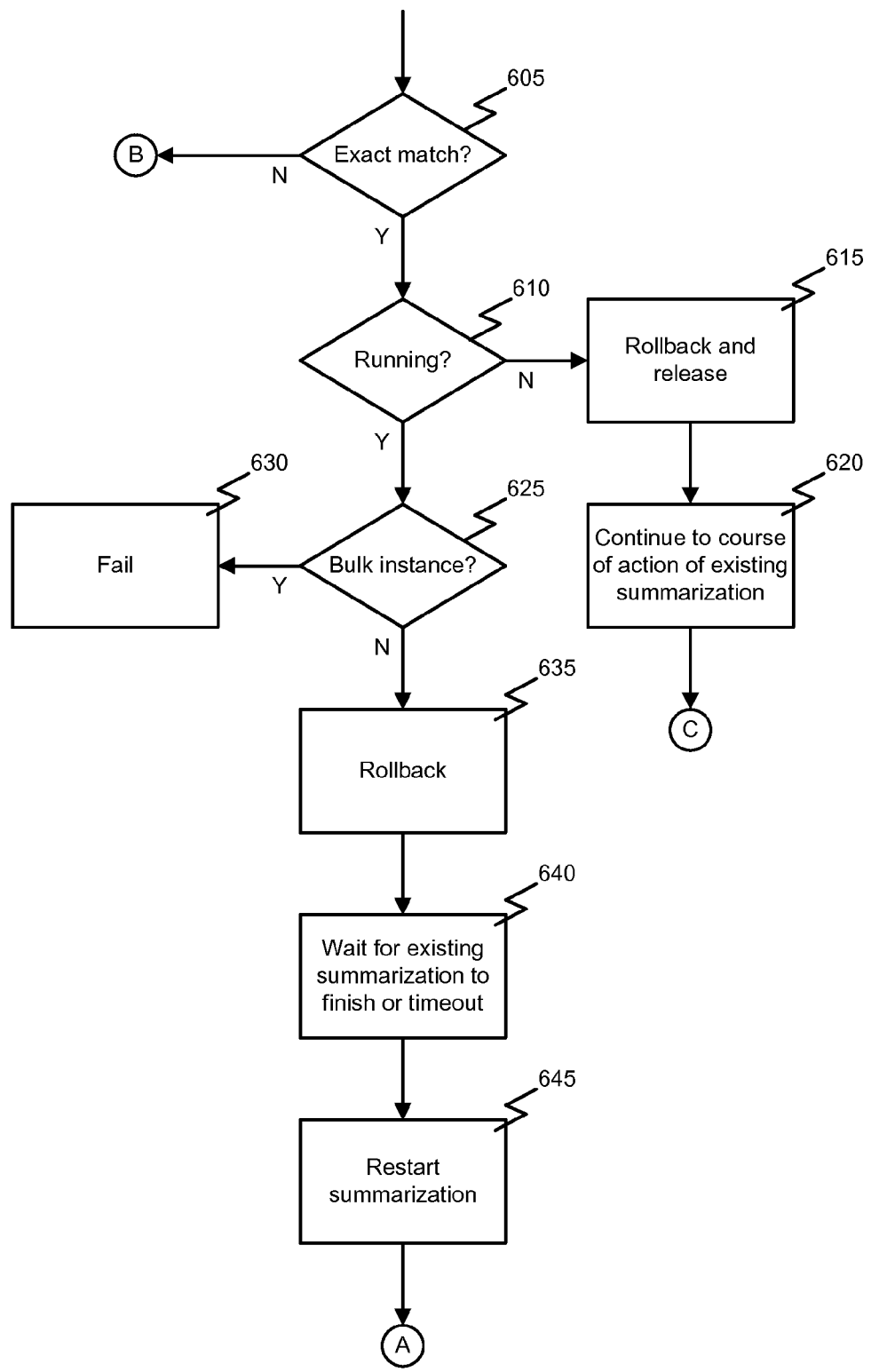
FIG. 6 is a flowchart illustrating additional details of an exemplary process for processing matching summarization instances according to one embodiment of the present invention.

FIG. 6 is a flowchart illustrating additional details of an exemplary process for processing matching summarization instances according to one embodiment of the present invention. In this example, processing existing data summarization instances that match the new data summarization instance can comprise determining 605 whether there are existing data summarization instances that match the new data summarization instance and determining 610 whether a matching instance is running. In response to determining 610 that the matching existing data summarization instance is not running, the new data summarization instance can be rolled back 615 and the exclusive lock released and the new data summarization instance can be picked up 620 using the matching existing data summarization instance, so that the thread of the new data summarization instance can become associated with the state of the matching existing data summarization instance, at which time the matching existing data summarization instance can change from being a failed existing data summarization instance to being a running existing data summarization instance.

In response to determining 610 that the matching existing data summarization instance is running, a determination 625 can be made as to whether the matching existing data summarization instance is a bulk data summarization instance. In response to determining 625 the running matching existing data summarization instance is a bulk data summarization instance, an error message can be issued and further processing of the new data summarization instance can be ended 630. In response to determining 625 the running matching existing data summarization instance is not a bulk data summarization instance, processing can continue with rolling back 635 the new data summarization instance and releasing the exclusive lock, waiting 640 for the running matching existing data summarization instance to finish or timeout, the timeout causing an error message to be issued and further processing of the new data summarization instance to be ended, and restarting 645 the new data summarization instance.

Figure 7:
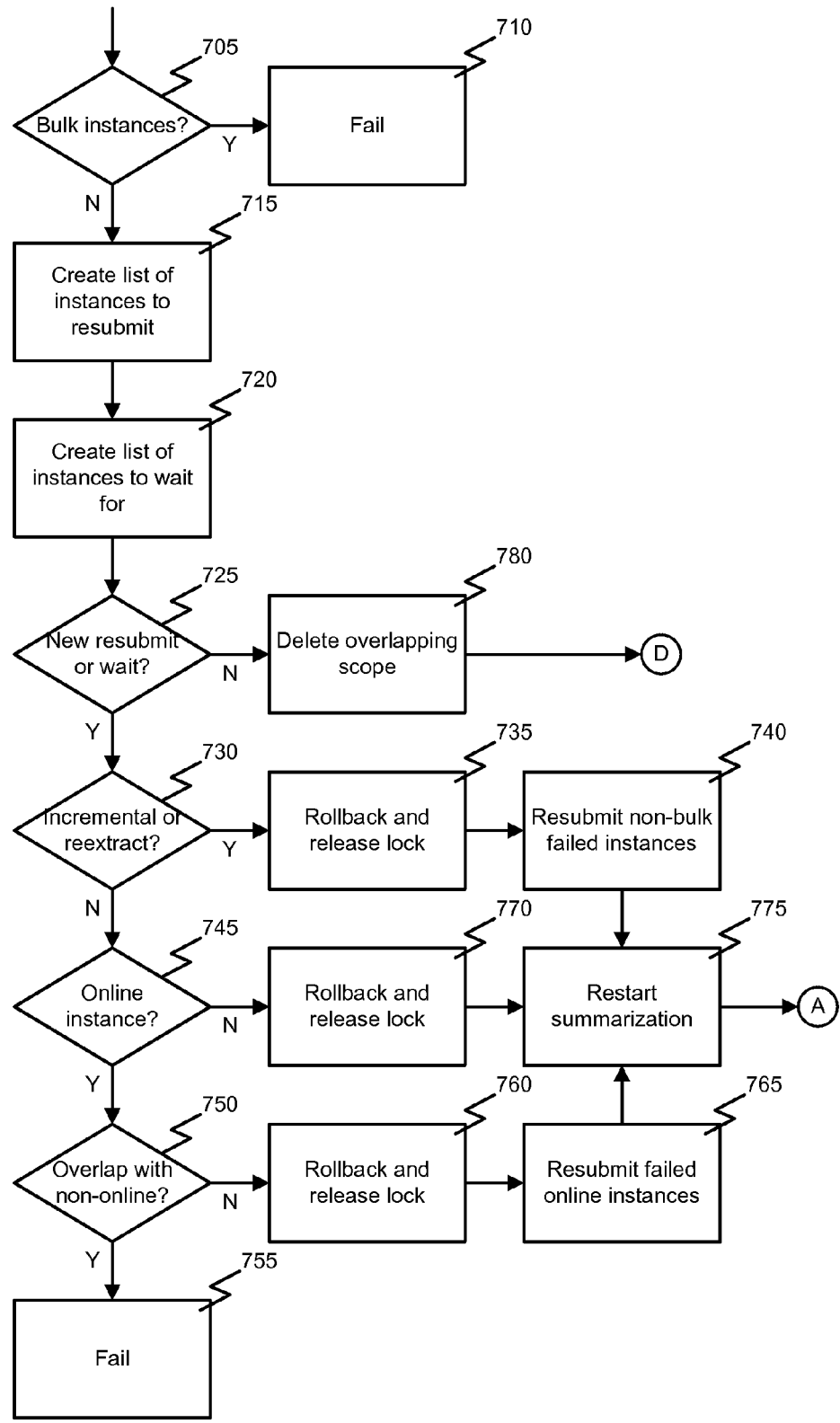
FIG. 7 is a flowchart illustrating additional details of an exemplary process for processing overlapping summarization instances according to one embodiment of the present invention.

FIG. 7 is a flowchart illustrating additional details of an exemplary process for processing overlapping summarization instances according to one embodiment of the present invention. In this example, processing existing data summarization instances that have an overlapping scope with the new data summarization instance can comprise determining 705 whether the new data summarization instance that has an overlapping scope with existing data summarization instances is a bulk summarization instance. In response to determining 705 that the new data summarization instance that has an overlapping scope with existing data summarization instances is a bulk summarization instance, an error message can be issued and further processing of the new data summarization instance can be ended 710.

In response to determining 705 that the new data summarization instance that has an overlapping scope with existing data summarization instances is not a bulk summarization instance, processing can continue with creating 715 a list of existing data summarization instances to resubmit, creating 720 a list of existing data summarization instances to wait for, processing any existing data summarization instances to resubmit or any existing data summarization instances to wait for that are newly added to the lists, processing any incremental or re-extract existing data summarization instances, and processing any online existing data summarization instances.

More specifically, processing any existing data summarization instances to resubmit or any existing data summarization instances to wait for that are newly added to the lists can comprise determining 725 whether there are any existing data summarization instances to resubmit or any existing data summarization instances to wait for that are newly added to the lists. In response to determining 725 that there are existing data summarization instances to resubmit or any existing data summarization instances to wait for that are newly added to the lists, and that the lists have previously been created for the new data summarization instance, then the overlapping scope can be deleted 780 from the new data summarization instance.

In response to determining 725 that there are existing data summarization instances to resubmit or any existing data summarization instances to wait for that are newly added to the lists, and that the lists have not previously been created for the new data summarization instance, then a determination 730 can be made as to whether the new data summarization instance is an incremental or re-extract instance. In response to determining 730 that the new data summarization instance is an incremental or re-extract instance, the new data summarization instance can be rolled back 735 and the exclusive lock can be released, and any non-bulk existing failed data summarization instances in the lists can be resubmitted 740 and data summarization for the new data summarization instance can be restarted 775.

In response to determining 730 that the new data summarization instance is not an incremental or re-extract instance, a further determination 745 can be made as to whether the new data summarization instance is not an online instance. In response to determining 745 that the new data summarization instance is not an online instance, the new data summarization instance can be rolled back 770 and the exclusive lock released and data summarization for the new data summarization instance can be restarted 775.

In response to determining 745 that the new data summarization instance is an online instance, a further determination 750 can be made as to whether the new online data summarization instance does not overlap with a non-online data summarization instance. In response to determining 750 that the new online data summarization instance does not overlap with a non-online instance, processing can continue with rolling back 760 the new online data summarization instance, and the exclusive lock can be released, to resubmit any existing failed online data summarization instances 765 and data summarization for the new data summarization instance can be restarted 775. In response to determining 750 that the new online data summarization instance overlaps with a non-online data summarization instance, an error message can be issued and further processing of the new data summarization instance can be ended 755.

Stated another way, one possible algorithm for implementing summarization recovery such as outlined above with reference to FIGS. 4-7 can be implemented as follows:

```
Label: <<restart_summarization>>
If 405 there are existing summarization instances for which the newly submitted
summarization instance needs to wait (as determined by a previous pass through the
algorithm)
        410 Set 505 a suitable timeout duration and poll 510 the status of the
        overlapping instances until they are all complete 515 or until the timeout 520
        is reached
End if
Acquire 415 exclusive lock on the database table that is used to store summarization
scope (so that only one summarization instance can continue)
Loop 420 through all existing summarization instances to see if the parameters of the
newly submitted summarization instance match those of any existing summarization instance
        If 605 the parameters match exactly to an existing summarization instance
                If 610 that summarization instance is running
                        If 625 that summarization instance is not a Bulk instance
                                Rollback 635 (release the exclusive lock)
                                Wait 640 for that summarization instance to complete
                                (potentially timing out and raising an error)
                                Goto 645 <<restart_summarization>>
                        Else if 625 that summarization instance is a Bulk instance
                                Fail 630 (we do not want to wait for a long running Bulk
                                process)
                        End if
                Else if 610 that summarization instance is not running
                        Rollback 615 (release the exclusive lock)
                        Pick up 620 work where that summarization instance has left off
                        (this includes recording summarization state such that if another
                        process polls the status of this existing summarization instance,
                        it will be checking the process of the newly submitted
                        summarization instance which has picked up the existing
                        summarization instance)
                        Execution passes out of this algorithm and onto the course of
                        action of the existing summarization instance
                End if
        End if
End loop
If 425 there are practical or imposed limits on the number of summarization instances
that can exist at any one time and there is no room for the newly submitted summarization
instance
        Fail 430 (all failures and actions should have suitable user notifications)
End if
Using the parameters from the newly submitted summarization instance, determine 435 the
scope of summarization (i.e. the list of elements that can be compared with other
summarization instances) and write 440 it to the database
If 442 the scope of the newly submitted summarization instance overlaps with any existing
summarization instances process 445 overlapping instances (note that their scope has been
committed to the database and cannot be changed while the exclusive lock exists)
        If 705 the newly submitted summarization instance is a Bulk instance
```

```
        Fail 710 (We do not want to break up the scope of a Bulk instance since it
        defeats the purpose of doing a large volume run all at once. We do not
        want a Bulk instance to wait for other summarization instances, since we
        want to know immediately if a Bulk instance is waiting rather than
        summarizing data.)
    End if
    Loop through the overlapping instances to determine whether we need to resubmit
    them and/or wait for them to complete
        Create 715 a list of instances that we need to resubmit (are failed)
        Create 720 a list of instances for which we need to wait (are running)
        (Note: these lists are used upon returning to <<restart_summarization>>)
    End loop
    If 725 the newly submitted summarization instance has not previously attempted to
    resubmit and/or wait for existing instances
        If 730 the newly submitted summarization instance is an Incremental or
        Reextract instance
            Rollback 735 (release exclusive lock)
            Resubmit 740 all non-Bulk failed summarization instances (We do
            not want to resubmit a Bulk instance because we want Bulk
            submissions to be direct user actions.)
        Else if 745 the newly submitted summarization instance is an Online
        instance
            If 750 some of the overlapping instances are not Online instances
                Fail 755 (User expectation can be that Online instances
                will always complete quickly, so we cannot wait for longer
                running Incremental, Reextract and Bulk instances to
                complete. Furthermore, Online scope can be defined by a
                functional batch of data rather than parameters defining a
                strict list of scope elements, so it may not make
                functional sense to skip any scope.)
            End if
            Rollback 760 (release exclusive lock)
            Resubmit 765 all Online failed summarization instances
        End if
        Rollback 770 (release exclusive lock)
        Goto 775 <<restart_summarization>>
    Else if 725 the newly submitted summarization instance has already attempted to
    resubmit and/or wait for existing instances
        Delete 780 all overlapping scope from the scope of the newly submitted
        summarization instance (and notify the user)
    End if
(Note that if control gets this far, then the scope for the newly submitted summarization
instance is finalized.)
If 450 the newly submitted summarization instance is a recovery only instance
    Rollback 455 (release exclusive lock)
    End execution (since the recovery methods have been executed)
End if
If 460 no scope remains for the newly submitted summarization instance
    Fail 465 (Raise suitable message to inform the user that there is no scope
    remaining on which to summarize data. Note that the notification would also have
    been raised about what scope has been skipped.)
End if
Write 470 all summarization state to the database
Determine 475 the course of action for the summarization instance (that is, the steps
that the summarization instance needs to execute) and write 480 it to the database
Commit 485 (release exclusive lock and the newly submitted summarization instance becomes
an existing summarization instance)
Continue 490 onto the course of action for the summarization instance
```

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for recovering a failed data summarization instance of a plurality of data summarization instances, the method comprising:

processing one or more existing data summarization instances of the plurality of data summarization instances identified as an instance for which a new data summarization instance needs to wait;

upon a completion or a timeout of each of the one or more existing data summarization instances identified as instances for which the new data summarization instance needs to wait, acquiring an exclusive lock on a table storing scope information for the plurality of data summarization instances;

processing one or more existing data summarization instances of the plurality of data summarization instances that match the new data summarization instance or that have an overlapping scope with the new data summarization instance;

defining remaining tasks to be performed by the new data summarization instance;

releasing the exclusive lock; and performing the remaining tasks to be performed by the new data summarization instance.

2. The method of claim 1, wherein processing existing data summarization instances identified as data summarization instances for which the new data summarization instance needs to wait comprises:

setting a timeout limit for each data summarization instance identified as a data summarization instance for which the new data summarization instance needs to wait;

periodically polling a status of each data summarization instance identified as a data summarization instance for which the new data summarization instance needs to wait;

expiring any data summarization instance identified as a data summarization instance for which the new data summarization instance needs to wait that has exceeded the timeout limit; and repeating polling a status of each data summarization instance identified as a data summarization instance for which the new data summarization instance needs to wait and expiring any data summarization instance identified as a data summarization instance for which the new data summarization instance needs to wait that has exceeded the timeout limit until all data summarization instances identified as data summarization instances for which the new data summarization instance needs to wait have completed or expired.

3. The method of claim 1, wherein processing existing data summarization instances that match the new data summarization instance comprises:

determining whether an existing data summarization instance that matches the new data summarization instance is running;

in response to determining that the matching existing data summarization instance is not running, rolling back the new data summarization instance, releasing the exclusive lock, and picking up the matching existing data summarization instance using the state of the matching existing data summarization instance;

in response to determining that the matching existing data summarization instance is running, determining whether the matching existing data summarization instance is a bulk data summarization instance; and in response to determining the running matching existing data summarization instance is not a bulk data summarization instance, rolling back the new data summarization instance, releasing the exclusive lock, waiting for the running matching existing data summarization instance to finish or timeout, the timeout causing an error message to be issued and further processing of the new data summarization instance to be ended, and restarting the new data summarization instance.

4. The method of claim 3, further comprising, in response to determining the running matching existing data summarization instance is a bulk data summarization instance, issuing an error message and ending further processing of the new data summarization instance.

5. The method of claim 1, wherein processing existing data summarization instances that have an overlapping scope with the new data summarization instance comprises:

determining whether the new data summarization instance that has an overlapping scope with existing data summarization instances is a bulk summarization instance;

in response to determining the new data summarization instance that has an overlapping scope with existing data summarization instances is a bulk summarization instance, issuing an error message and ending further processing of the new data summarization instance;

in response to determining that the new data summarization instance that has an overlapping scope with existing summarization instances is not a bulk summarization instance, creating a list of existing data summarization instances to resubmit, creating a list of existing data summarization instances to wait for, processing any existing data summarization instances to resubmit or any existing data summarization instances to wait for that are newly added to the lists, processing any incremental or re-extract existing data summarization instances, and processing any online existing data summarization instances.

6. The method of claim 5, wherein processing any existing data summarization instances to resubmit or any existing data summarization instances to wait for that are newly added to the lists comprises deleting overlapping scope from the new data summarization instance.

7. The method of claim 5, wherein processing any incremental or re-extract existing data summarization instances comprises rolling back the new data summarization instance, releasing the exclusive lock, and resubmitting any non-bulk existing data summarization instances in the list.

8. The method of claim 5, wherein processing any online existing data summarization instances comprises determining whether the new data summarization instance is an online instance and in response to determining that the new data summarization instance is not an online instance, rolling back the new data summarization instance, releasing the exclusive lock, and restarting data summarization.

9. The method of claim 8, processing any online existing data summarization instances further comprises in response to determining the new data summarization instance is an online instance, determining whether the new data summarization instance overlaps with non-online instances, and in response to determining that the new data summarization instance does not overlap with non-online instances rolling back the new data summarization instance, releasing the exclusive lock, and resubmitting the new data summarization instance.

10. The method of claim 9, further comprising in response to determining that the new data summarization instance overlaps with non-online instances, issuing an error message and ending further processing of the new data summarization instance.

11. A system comprising:

a processor; and a memory communicatively coupled with and readable by the processor and having stored therein a sequence of instructions which, when executed by the processor, cause the processor to recover a failed data summarization instance of a plurality of data summarization instances by:

processing one or more existing data summarization instances of the plurality of data summarization instances identified as an instance for which a new data summarization instance needs to wait;

upon a completion or a timeout of each of the one or more existing data summarization instances identified as instances for which the new data summarization instance needs to wait, acquiring an exclusive lock on a table storing scope information for the plurality of data summarization instances;

processing one or more existing data summarization instances of the plurality of data summarization instances that match the new data summarization instance or that have an overlapping scope with the new data summarization instance;

defining remaining tasks to be performed by the new data summarization instance;

releasing the exclusive lock; and performing the remaining tasks to be performed by the new data summarization instance.

12. The system of claim 11, wherein processing existing data summarization instances identified as data summarization instances for which the new data summarization instance needs to wait comprises:

setting a timeout limit for each data summarization instance identified as a data summarization instance for which the new data summarization instance needs to wait;

periodically polling a status of each data summarization instance identified as a data summarization instance for which the new data summarization instance needs to wait;

expiring any data summarization instance identified as a data summarization instance for which the new data summarization instance needs to wait that has exceeded the timeout limit; and repeating polling a status of each data summarization instance identified as a data summarization instance for which the new data summarization instance needs to wait and expiring any data summarization instance identified as a data summarization instance for which the new data summarization instance needs to wait that has exceeded the timeout limit until all data summarization instances identified as data summarization instances for which the new data summarization instance needs to wait have completed or expired.

13. The system of claim 11, wherein processing existing data summarization instances that match the new data summarization instance comprises:

determining whether an existing data summarization instance that matches the new data summarization instance is running;

in response to determining that the matching existing data summarization instance is not running, rolling back the new data summarization instance, releasing the exclusive lock, and picking up the matching existing data summarization instance using the state of the matching existing data summarization instance;

in response to determining that the matching existing data summarization instance is running, determining whether the matching existing data summarization instance is a bulk data summarization instance; and in response to determining the running matching existing data summarization instance is not a bulk data summarization instance, rolling back the new data summarization instance, releasing the exclusive lock, waiting for the running matching existing data summarization instance to finish or timeout, the timeout causing an error message to be issued and further processing of the new data summarization instance to be ended, and restarting the new data summarization instance.

14. The system of claim 13, further comprising, in response to determining the running matching existing data summarization instance is a bulk data summarization instance, issuing an error message and ending further processing of the new data summarization instance.

15. The system of claim 11, wherein processing existing data summarization instances that have an overlapping scope with the new data summarization instance comprises:

determining whether the new data summarization instance that has an overlapping scope with existing data summarization instances is a bulk summarization instance;

in response to determining the new data summarization instance that has an overlapping scope with existing data summarization instances is a bulk summarization instance, issuing an error message and ending further processing of the new data summarization instance;

in response to determining that the new data summarization instance that has an overlapping scope with existing summarization instances is not a bulk summarization instance, creating a list of existing data summarization instances to resubmit, creating a list of existing data summarization instances to wait for, processing any existing data summarization instances to resubmit or any existing data summarization instances to wait for that are newly added to the lists, processing any incremental or re-extract existing data summarization instances, and processing any online existing data summarization instances.

16. A computer-readable memory device having stored therein a sequence of instructions which, when executed by a processor, cause the processor to recover a failed data summarization instance of a plurality of data summarization instances by:

processing one or more existing data summarization instances of the plurality of data summarization instances identified as an instance for which a new data summarization instance needs to wait;

upon a completion or a timeout of each of the one or more existing data summarization instances identified as instances for which the new data summarization instance needs to wait, acquiring an exclusive lock on a table storing scope information for the plurality of data summarization instances;

processing one or more existing data summarization instances of the plurality of data summarization instances that match the new data summarization instance or that have an overlapping scope with the new data summarization instance;

defining remaining tasks to be performed by the new data summarization instance;

releasing the exclusive lock; and performing the remaining tasks to be performed by the new data summarization instance.

17. The computer-readable memory device of claim 16, wherein processing existing data summarization instances identified as data summarization instances for which the new data summarization instance needs to wait comprises:

setting a timeout limit for each data summarization instance identified as a data summarization instance for which the new data summarization instance needs to wait;

periodically polling a status of each data summarization instance identified as a data summarization instance for which the new data summarization instance needs to wait;

expiring any data summarization instance identified as a data summarization instance for which the new data summarization instance needs to wait that has exceeded the timeout limit; and repeating polling a status of each data summarization instance identified as a data summarization instance for which the new data summarization instance needs to wait and expiring any data summarization instance identified as a data summarization instance for which the new data summarization instance needs to wait that has exceeded the timeout limit until all data summarization instances identified as data summarization instances for which the new data summarization instance needs to wait have completed or expired.

18. The computer-readable memory device of claim 16, wherein processing existing data summarization instances that match the new data summarization instance comprises:

determining whether an existing data summarization instance that matches the new data summarization instance is running;

in response to determining that the matching existing data summarization instance is not running, rolling back the new data summarization instance, releasing the exclusive lock, and picking up the matching existing data summarization instance using the state of the matching existing data summarization instance;

in response to determining that the matching existing data summarization instance is running, determining whether the matching existing data summarization instance is a bulk data summarization instance; and in response to determining the running matching existing data summarization instance is not a bulk data summarization instance, rolling back the new data summarization instance, releasing the exclusive lock, waiting for the running matching existing data summarization instance to finish or timeout, the timeout causing an error message to be issued and further processing of the new data summarization instance to be ended, and restarting the new data summarization instance.

19. The computer-readable memory device of claim 18, further comprising, in response to determining the running matching existing data summarization instance is a bulk data summarization instance, issuing an error message and ending further processing of the new data summarization instance.

20. The computer-readable memory device of claim 16, wherein processing existing data summarization instances that have an overlapping scope with the new data summarization instance comprises:

determining whether the new data summarization instance that has an overlapping scope with existing data summarization instances is a bulk summarization instance;

in response to determining the new data summarization instance that has an overlapping scope with existing data summarization instances is a bulk summarization instance, issuing an error message and ending further processing of the new data summarization instance;

in response to determining that the new data summarization instance that has an overlapping scope with existing summarization instances is not a bulk summarization instance, creating a list of existing data summarization instances to resubmit, creating a list of existing data summarization instances to wait for, processing any existing data summarization instances to resubmit or any existing data summarization instances to wait for that are newly added to the lists, processing any incremental or re-extract existing data summarization instances, and processing any online existing data summarization instances.

* * * * *

UNITED STATES PATENT AND TRADEMARK OFFICE
CERTIFICATE OF CORRECTION

PATENT NO.         : 8,839,033 B2                                      Page 1 of 1
APPLICATION NO.    : 13/408045
DATED              : September 16, 2014
INVENTOR(S)        : Vermette et al.

It is certified that error appears in the above-identified patent and that said Letters Patent is hereby corrected as shown below:

In the Specification

In column 8, line 7, delete "340" and insert -- 340. --, therefor.

Signed and Sealed this
Seventeenth Day of March, 2015

Michelle K. Lee
*Director of the United States Patent and Trademark Office*